United States Patent [19]

Hallock

[11] Patent Number: 4,531,154

[45] Date of Patent: Jul. 23, 1985

[54] INTERFACE FOR A VIDEO DISPLAY PROCESSOR ARRANGED TO PROVIDE AN OVERLAY ON A VIDEO DISPLAY

[75] Inventor: Gary W. Hallock, Randolph, N.J.

[73] Assignee: AT&T Bell Laboratories, Murray Hill, N.J.

[21] Appl. No.: 437,879

[22] Filed: Oct. 29, 1982

[51] Int. Cl.³ .............................................. H04N 5/06
[52] U.S. Cl. ................................... 358/148; 358/150
[58] Field of Search ............... 358/148, 149, 150, 154, 358/153

[56] References Cited

U.S. PATENT DOCUMENTS

| 4,319,275 | 3/1982 | Tanaka | 358/154 |
| 4,346,407 | 8/1982 | Baer | 358/148 |
| 4,425,581 | 1/1984 | Schweppe | 358/148 |
| 4,450,480 | 5/1984 | De La Cierva | 358/149 |
| 4,464,679 | 8/1984 | Wargo | 358/148 |
| 4,467,357 | 8/1984 | Cantou | 358/148 |

Primary Examiner—Michael A. Masinick
Attorney, Agent, or Firm—Barry H. Freedman

[57] ABSTRACT

When a source of video signals such as a video disc player is connected to a video display processor (VDP) arranged to overlay a picture with graphics, sync signal jitter and noise often produce an undesirable display in which the overlay moves left/right, bounces up/down, or even repeats. To avoid the problem, an interface circuit has been designed for interposition between the video source and the VDP. The interface includes (a) a video matching/sync stripper circuit for referencing the video signal to the levels generated by the VDP and for extracting the sync signal from the video input, and (b) a clean sync circuit including (1) a phase locked loop for deriving a horizontal sync signal, (2) a sync generator including a low-pass filter for deriving a vertical sync signal, and (3) a summer for combining the separate sync signals into a composite sync signal which is applied to the VDP.

4 Claims, 5 Drawing Figures

INTERFACE FOR A VIDEO DISPLAY PROCESSOR ARRANGED TO PROVIDE AN OVERLAY ON A VIDEO DISPLAY

TECHNICAL FIELD

This invention relates generally to an interface between a source of video signals and a video display processor (VDP) which provides a graphics and character overlay capability, and more particularly, to a hardware interface which allows the output of a video disc player to be synchronized with a display processor which can superimpose graphical representations on pictures generated by the video source for display on a television monitor.

BACKGROUND OF THE INVENTION

Several commercial product offerings known as video display processors (VDPs) or graphics display controllers are now available for either generating a graphics display or for processing a video signal so as to generate a graphics overlay which is superimposed on the picture represented by the video signal. When used in the overlay mode, the VDP is connected between a source of video signals and a display or broadcast device. The processor is arranged to receive a composite video signal as well as local or remotely generated data which defines the nature of the material to be overlaid, and to provide a video output in a standard NTSC format.

When a video disc player is used as a video source and connected directly to a video display processor, the resulting overlaid graphics have been found to be unsatisfactory, due primarily to jitter and noise in the sync pulses applied to the VDP. This jitter results from time base errors in the disc player output and noise from imperfections in the disc, and is noticed in several ways. First, horizontal jitter results in a varying horizontal scan rate (time base error) due to the player servo and recorded error, and causes all lines of the overlay to move left and right individually, making the characters appear wavy since the VDP does not track the jitter. The video picture from the disc appears to be stable on a video monitor, because the monitor itself corrects the disc video error by processing the disc's sync signals, while the overlay information is uncorrected and thus appears to move. Second, vertical jitter due to noise from the disc player being erroneously interpreted as horizontal sync pulses causes entire groups or all lines of the overlay to move up and down, making the characters appear to bounce. This problem, which becomes particularly noticeable when the disc player is in a still frame mode, results from the fact that large positive going noise spikes typically exist on only one field (e.g., odd) of the picture. Thus, when the graphics are overlaid, the relative position between the fields tends to change by one line, since the VDP's horizontal counters have an extra count for one field. The resulting upward movement of the overlay by one horizontal line space after a noise spike appears as up/down bounce, because the fields are interlaced.

A third problem occurs when excessive noise in the disc output is erroneously interpreted as a vertical sync pulse, causing the entire overlay to repeat at some point after the top of the picture. This phenomenon usually occurs when a large noise spike is adjacent to a horizontal sync pulse.

In view of the foregoing, it is the broad object of the present invention to provide an interface between a video signal source, such as a video disc player, and a video display processor which permits a picture to be overlaid with graphics without annoying effects caused by jitter and noise. Specific objects are the provision of a hardware interface circuit that corrects problems in sync pulses applied to the VDP from a video disc player and provides a clock input for the VDP which tracks the jitter.

SUMMARY OF THE INVENTION

The foregoing and additional objects are achieved in accordance with the present invention by an interface circuit designed for connection between a source of video signals such as a video disc player and a video display processor arranged to overlay a picture with graphics. The interface includes (a) a video matching-/sync stripper circuit for referencing the video signal to the levels generated by the VDP and for extracting the sync signal from the video input, (b) a phase-locked loop responsive to the extracted sync signal for deriving both a clock signal for the VDP clock input as well as a horizontal sync signal for the VDP sync input, and (c) a sync circuit including a low-pass filter and a vertical sync generator for deriving a vertical sync signal from the extracted sync information. If required, a summer may be used to combine the separate vertical and horizontal sync signals into a composite sync signal which is applied to the VDP. A color subcarrier regenerator may also be included in the interface circuit.

BRIEF DESCRIPTION OF THE DRAWINGS

The principles of operation of the present invention will be more fully appreciated by consideration of the following detailed description when read in light of the accompanying drawing in which.

DETAILED DESCRIPTION

Figure 1:
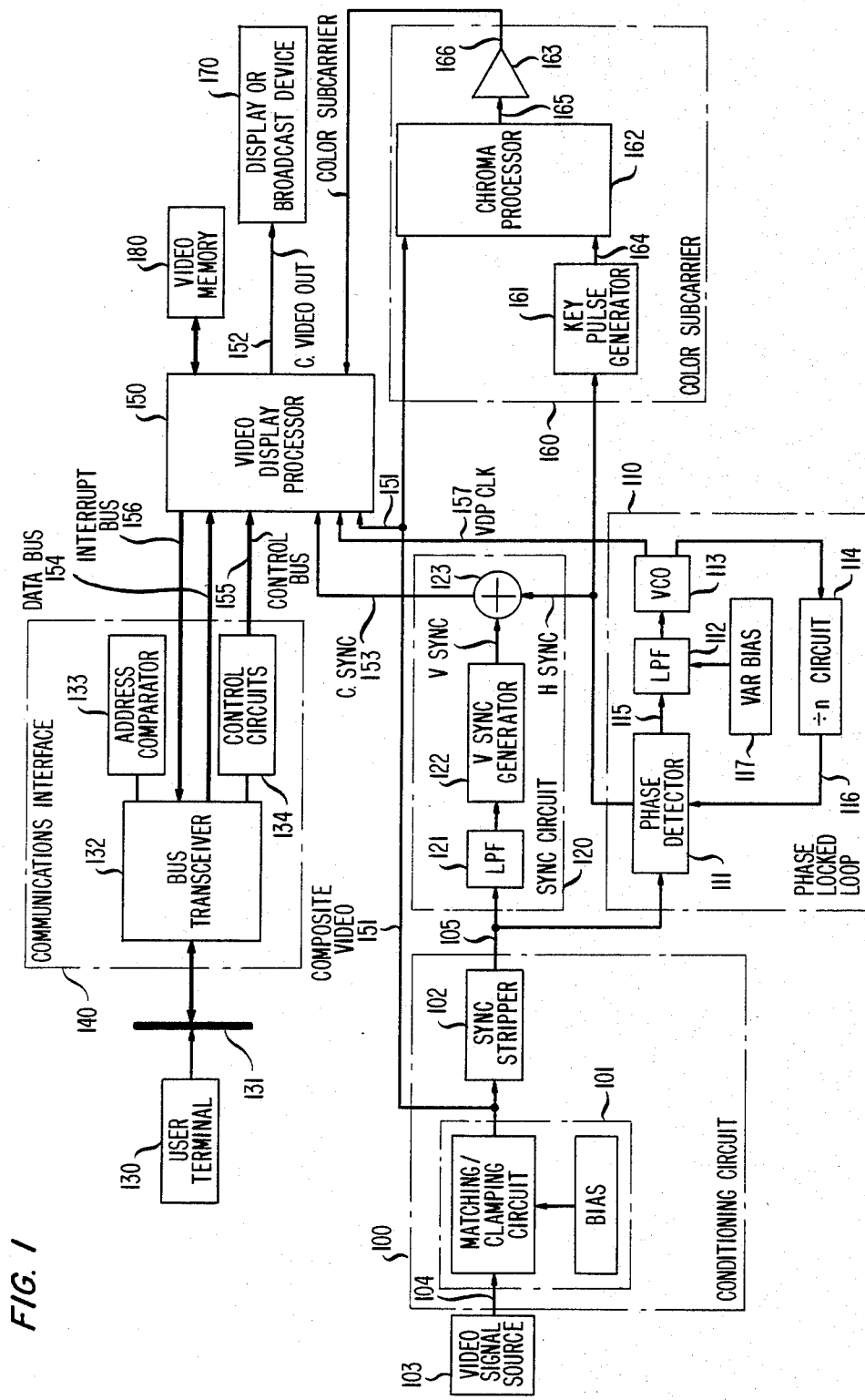
FIG. 1 is a block diagram showing an example of how the interface circuit of the present invention is interconnected with a video display processor and its associated circuitry.

Before describing the interface circuit of the present invention in detail, a general understanding of a video display processor and the video signal source to which it is connected will be useful. One VDP which performs well, and which will be used as an example in the following description, is the Texas Instruments model TMS 9918A video display processor 150, which is shown as part of the block diagram of FIG. 1 and described in detail in "TMS 9918A Video Display Processor Data Manual", Texas Instruments, November 1980. Processor 150 operates in two modes, namely, graphics and external video (graphics overlay), but the present invention concerns only the latter. The VDP receives data and control information on data and control buses 154 and 155, respectively, from a communications interface 140, described below, returns interrupts and other signals to interface 140 via interrupt bus 156, and supplies its composite video output on line 152 to a display or broadcast device 170. Elemental patterns, graphics and text which are combined and used to make up the display are stored in video memory 180. In the external video mode, a composite video signal received on line 151 from a video signal source 103 via the interface circuit of the present invention is provided with an overlay in accordance with user defined inputs received from communications interface 140. This mode requires not only a VDP clock input on line 157 but also a sync input on line 153. For the Texas Instruments processor, circuitry necessary to key in data defining the overlay is internal to the device, but for other processors, external circuits may be used for keying.

Communications interface 140, as stated above, serves to couple data and control information provided by the user to processor 150. Such user provided data can originate in a remote user terminal 130, and is provided to the system via bus 131. Interface 140 may be a serial communications interface in accordance with the RS-232 EIA standard or a processor bus interface as shown in FIG. 1 such as the DEC Q-bus or similar circuitry which transforms the user provided data and control signals into the proper format needed by VDP 150. It includes a bus transceiver 132 which demultiplexes information received from bus 131 into separate address and data signals, as well as control signals. The data signals are applied directly to VDP 150 via data bus 154, while the address signals are applied to an address comparator 133 which insures that the information being received from bus 131 is indeed intended for application to the VDP. Control circuits 134 receive the control signals contained in the information received from bus 131 and extend such information to VDP 150 on control bus 155 in order to interpret the meaning of the data on bus 154, i.e., text information, location on the display, and attributes such as size and in some cases, color. Status signals generated by VDP 150 indicating interrupt and coincidence conditions are returned to interface 140 via interrupt bus 156. A more complete description of the data and control interface to VDP 150 is contained in the above-cited TI Processor Manual.

To understand the nature of the jitter problem that occurs when VDP 150 is used in the external video mode, a basic understanding of its operating principles and video waveform characteristics are required.

A typical VDP such as the TMS 9918A includes a VDP clock input (received on line 157) which determines the rate at which pixels are generated. A pixel is the finest point of resolution generated by the VDP; for example, a screen defined by the TI VDP includes 256×192 visible pixels. It also includes a sync input received on line 153 which can accept separate vertical and horizontal components, or a composite. The vertical sync input insures that the VDP vertical interval coincides with that of the video source. The horizontal sync input may be necessary to determine the start of each new line, if this information cannot be provided internal to the VDP. An input received on line 166 requiring a regenerated color subcarrier signal is also found in certain VDP's, in order to insure proper color lock with the video signal source.

The critical performance characteristics of the video signal source which provides the composite video input (line 151) to the VDP via the interface circuit of the present invention relate to (1) the variation of the horizontal scanning frequency (jitter) due to time base error and (2) noise below the blanking level (sync negative signal) which could interfere with the sync pulse information. When a video signal is derived from a video disc player, servo tracking error often produces jitter, while imperfections in the discs themselves produce noise. The extent of the problem was investigated by examining a production video disc player (MCA model PR-7820) and several discs. Short term jitter was found to be less than 0.5 $\mu$S. However, the human eye (unlike the ear) is very unforgiving, and can see as little as 5 nS of jitter. Discs that were examined contained large noise pulses, typically as wide as 2 $\mu$S. By way of comparison, a normal horizontal sync pulse is 4.7 $\mu$S wide. Most of the noise pulses were located near the vertical sync pulse or equalizing interval. Depending on the disc and manufacturer, up to 25 to 75% of the frames were found to contain noise pulses large enough to cause problems in interfacing the VDP.

In order to avoid the problems just discussed, the interface circuit of the present invention provides synchronization between the sync signal contained in the disc player's composite video output, and the video display processor's clock and sync inputs. The interface circuit design is based on knowledge of characteristics of video signals, as well as VDP input requirements and performance standards. Under ideal conditions, the disc player output signal satisfies standards for television synchronizing waveforms developed by the NTSC, as shown in the NAB Engineering Handbook. Each frame is made up of 525 lines, and includes odd and even interlaced fields of 262½ lines each. Each line has a horizontal sync pulse (4.7 $\mu$S). Each field has a series of 6 vertical sync pulses (86 $\mu$S). preceded and followed by 6 equalizing pulses (2.5 $\mu$S). The TMS 9918A VDP sync input on line 153 requires a positive edge (short duration pulse) for horizontal sync and a positive pulse of at least 7.2 $\mu$S duration for vertical sync. Internal to the processor is a horizontal counter, which is clocked by horizontal sync inputs and effectively reset by a vertical sync pulse. It is used to map the overlay onto the composite video. When in the external video mode, all sync information present on the external video signal passes through to the VDP to the output display device, as opposed to being internally generated.

In accordance with the present invention, the horizontal jitter problem is corrected by shifting the VDP clock so that it tracks incoming horizontal sync from the video signal source. Correction of every horizontal line is made when the sync pulse occurs, requiring a fast transient response to correct an entire line at the start.

Vertical jitter/retrace is eliminated by gating out unwanted noise. This is done by creating a narrow window during which the horizontal sync is extracted.

Figure 3:
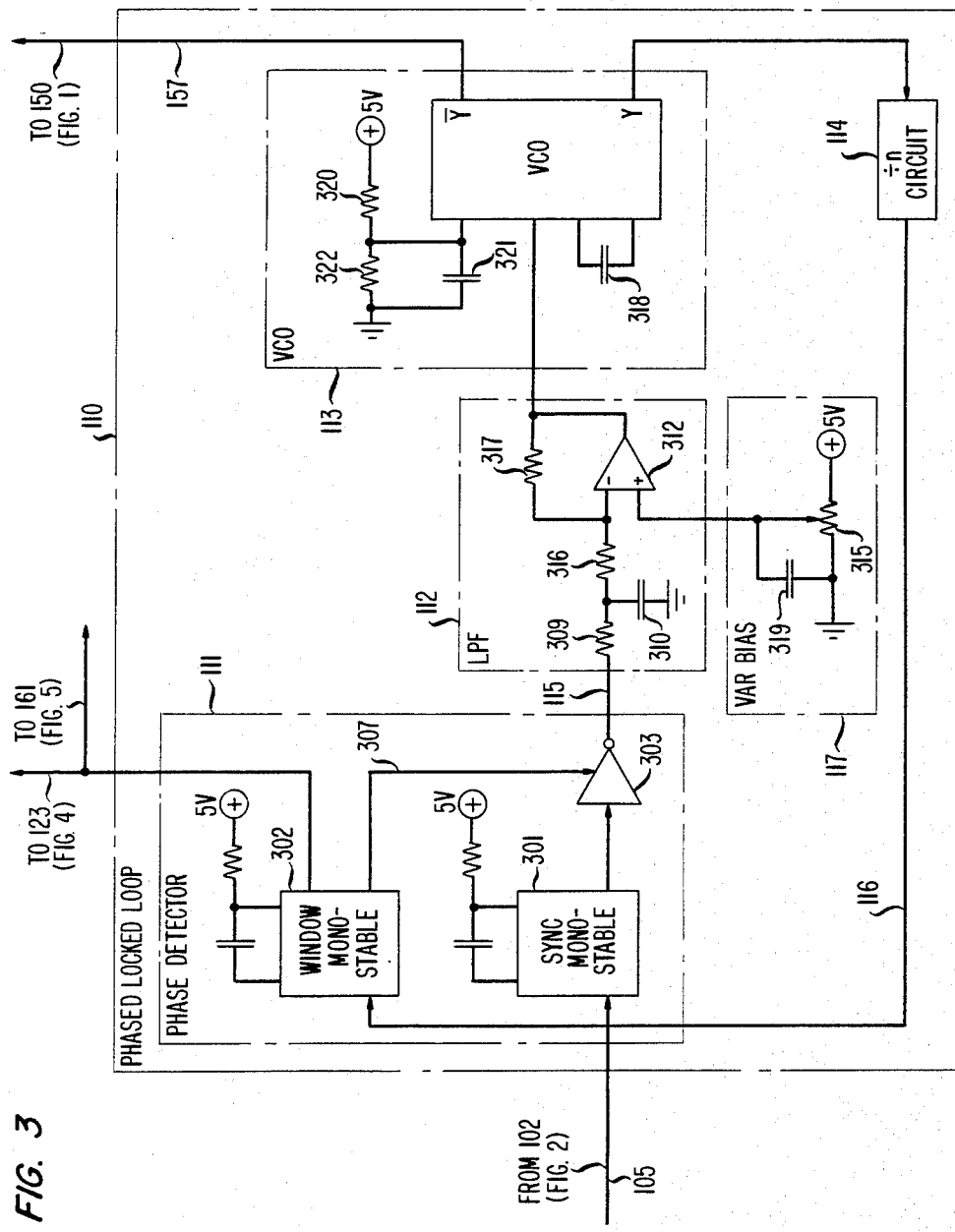
FIG. 3 is a circuit diagram of the phase-locked loop 110 included in the interface circuit of FIG. 1.
Figure 4:
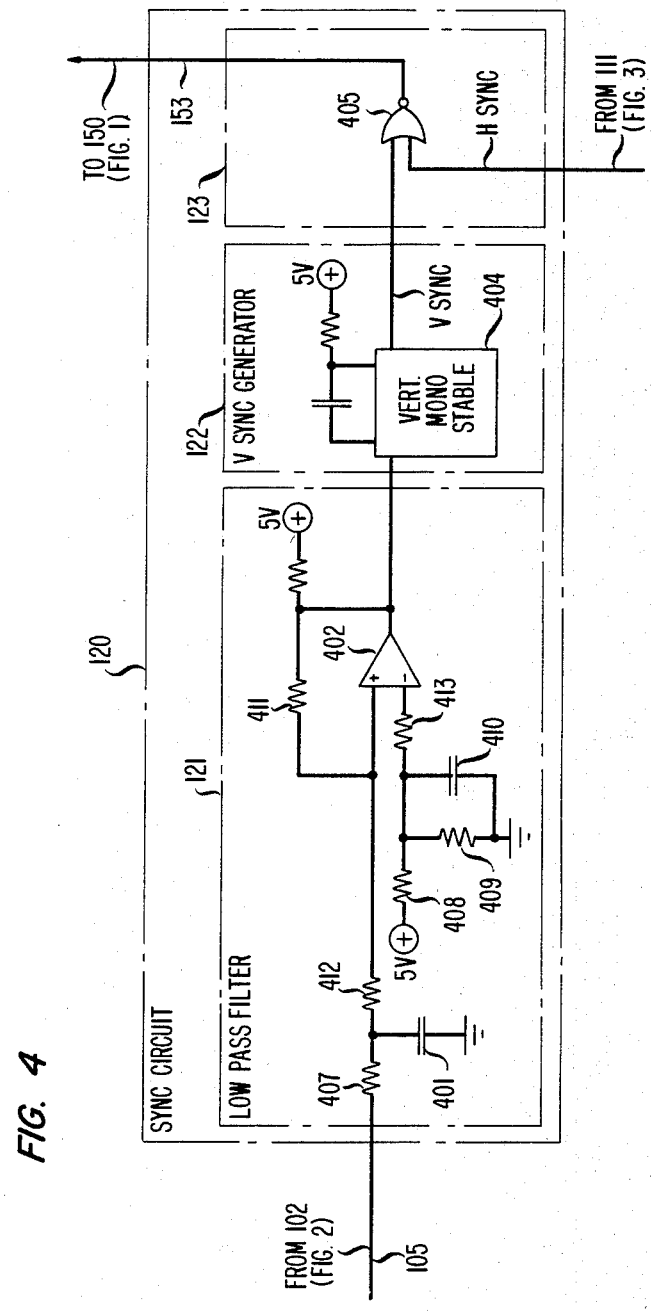
FIG. 4 is a circuit diagram of sync circuit 120 of FIG. 1.
Figure 5:
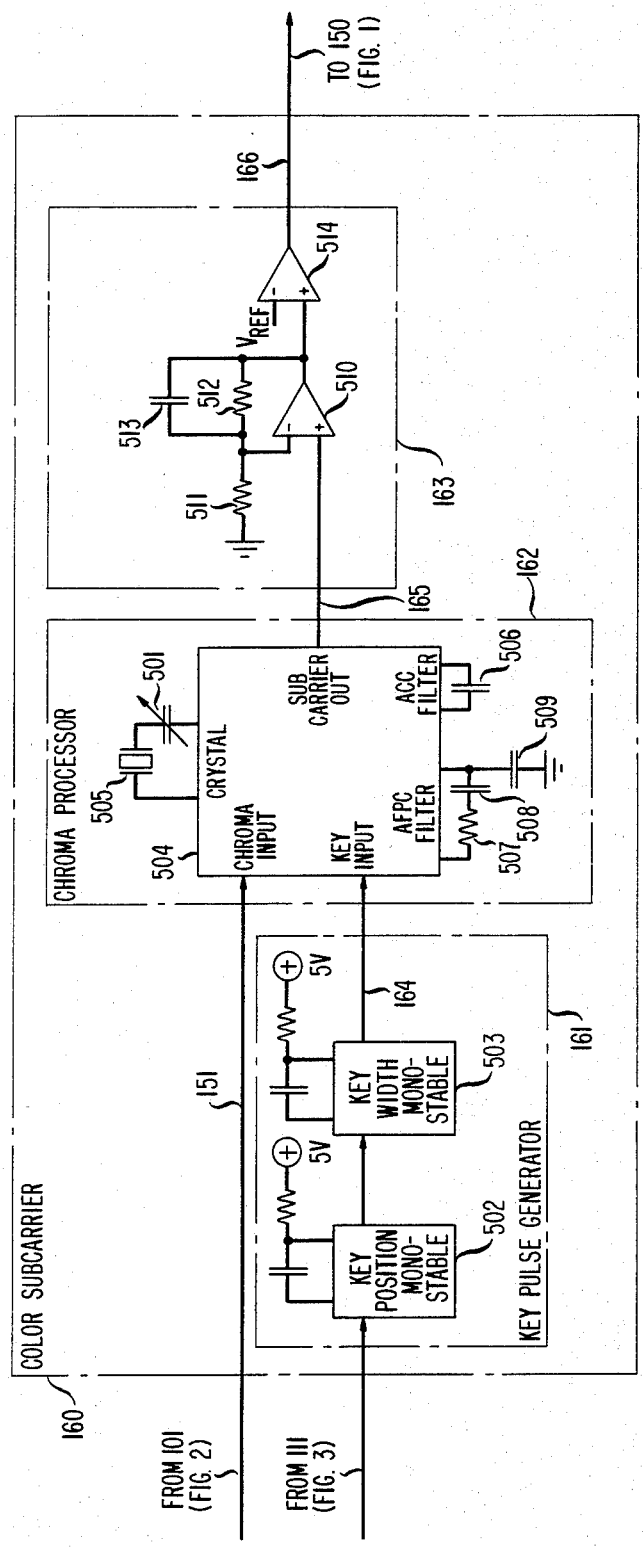
FIG. 5 is a circuit diagram of color subcarrier regenerator 160 of FIG. 1.

The interface circuit of the present invention, shown in the block diagram of FIG. 1, consists of four major functional parts which are shown in detail in FIGS. 2-5. They are an amplitude matching/clamping circuit and sync stripper which together form a signal conditioning circuit 100 (FIG. 2), a phase-locked loop 110 for the VDP clock (FIG. 3), a VDP 'clean' sync circuit 120 (FIG. 4), and a color subcarrier regenerator 160 (FIG. 5). Each circuit will be described in turn.

The overall purpose of the amplitude matching circuit 101 included within conditioning circuit 100 (shown in detail in FIG. 2) is to provide a standard 75 ohm input impedance (resistor 221) to the video signal from source 103, and to provide an internal 2 Vpp (volts peak to peak) signal to match overlay levels in VDP 150, thus insuring that the input composite video signal is properly referenced to the levels generated by the VDP. The standard composite video signal supplied by source 103 is 1 Vpp into 75 ohms. Sync information is contained in the lower 0.3 V region (sync negative), while the picture information is contained in the upper 0.7 V region.

Since matching circuit 101 has a standard 75 ohm impedance, the 1 Vpp input signal on line 104 which is to be coupled to the VDP's high impedance (>50K ohms) "external video" input 151 must be amplified by a factor of two, since VDP 150 is designed to overlay on a 2 Vpp signal. A wide bandwidth op amp 201 is used to provide the desired gain, thus matching the input signal swing to that needed by the VDP. Low feedback resistance, provided by resistors 202 and 203 and frequency compensation, provided by capacitor 204 are also desirable in matching circuit 101 to insure stability. Clamping is provided in conditioning circuit 100 by amplifier 205 in conjunction with diode 206 and capacitor 207. These components act as a d.c. restorer and reference the sync tip of the input signal to a d.c. level, thus matching the VDP's black level to that of the input signal. Resistors 208-210 provide necessary bias, and amplifier 211 isolates the clamped output from loading effects caused by succeeding stages. It can be noted here that VDP 150 typically has a standard 75 ohm output impedance, so that its composite video output on line 152 provides a standard 1 Vpp input to a 75 ohm load such as a video monitor.

Sync stripper circuit 102 in circuit 100 is designed to remove sync information (horizontal, vertical and equalizing) contained below the blanking level in the composite video signal output from matching circuit 101 on line 151. The only other information below that level is the color burst which reaches half the level of the sync pulse height.

Figure 2:
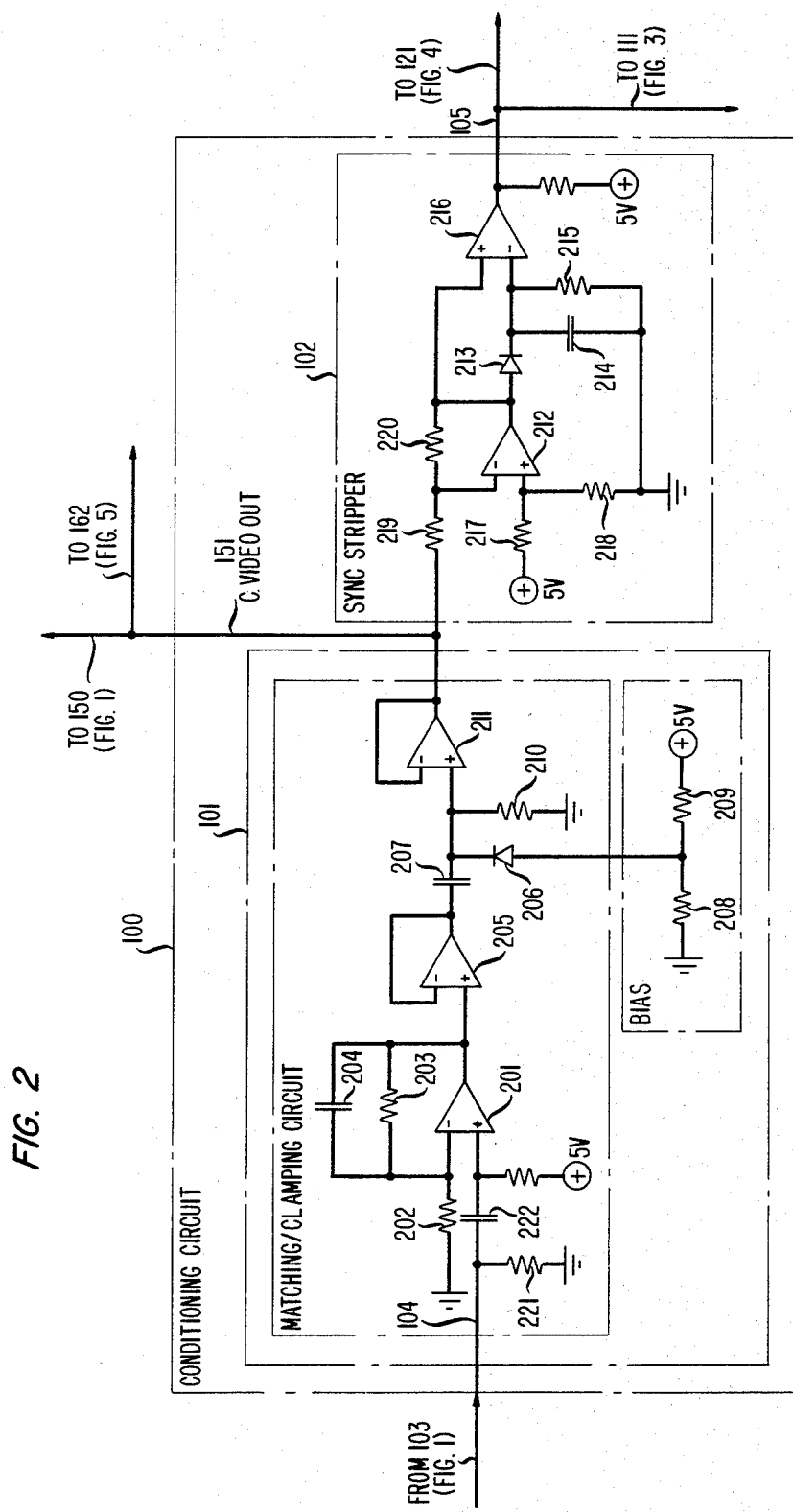
FIG. 2 is a circuit diagram of the amplitude matching/clamping and sync stripper circuits included in the interface circuit of the present invention.

The sync stripper, also shown in detail in FIG. 2, detects the peak value of the composite signal, using amplifier 212, diode 213, capacitor 214 and resistor 215 arranged in a peak detection configuration. Amplifier 212 in conjunction with resistors 217 and 218 sets a threshold midway between the peak color burst height and the sync tip, based upon the sync tip voltage. The sync pulses are then stripped off by amplifier 216 and a TTL compatible output is provided on line 105. Resistors 219 and 220 insure sufficient signal amplitude for proper operation of the circuit. Since conditioning circuit 100 provides a 75 ohm input impedance, matching and clamping as described, and includes a blocking capacitor 222, VDP 150 can advantageously operate with video sources, e.g., cameras, other than video disc players, independent of whether or not the source has a clamped output. Otherwise, the composite video signal applied to the VDP's composite video input on line 151 might not have the proper luminance reference level relative to the input signal.

Referring now to FIG. 3, there is shown in detail a digital phase-locked loop (PLL) 110 which provides a sync window in order to lock the 10.79+ MHz VDP clock input (for pixel generation) on line 157 to the 15.7 KHZ sync frequency of standard color signals. PLL 110 includes phase detector 111, low-pass filter 112, voltage controlled oscillator 113, and divide circuitry 114. Variable bias circuit 117 provides bias to VCO 113 through filter 112, but of course the bias voltage itself is not filtered.

Phase detector 111 produces an output voltage on line 115 proportional to the phase difference between a clock input on line 116 and sync pulses received from sync stripper 102 via line 105. Detector 111, shown in detail in FIG. 3, includes two monostable multivibrators 301 and 302 and a tri-state gate 303. Each monostable fires for approximately 1.0 μs, sync monostable 301 firing when a negative (leading) sync edge occurs and window monostable 302 firing when a positive clock edge occurs. The clock input to monostable 302 is derived from the output of a divide-by-n circuit 114, which divides the VDP clock output of the phase-locked loop 110 by a preselected divisor "n" using a dividing chain which may include several programmable dividers. When the loop is locked, the error signal output of gate 303 on line 115 is high 50 percent of the time (0.5 μs) and low 50 percent of the time (0.5 μs), when it is enabled by the gate signal output from monostable 302 on line 307. This ±0.5 μs range is important, because it provides a gating window for the sync signal which provides the desired immunity from interfering noise, as previously described. In particular, noise will not cause an erroneous error voltage to be generated unless the noise spike is within 0.5 μs before the sync pulse, which occurs every 63.5 μs. This is because no gate pulse on line 307 is generated to pass the output of monostable 301. The 0.5 μs range is also important because it is large enough to allow for the maximum jitter (time base error) expected in the sync signal. The lock/capture ranges of phase-locked loop 110, which are approximately equal, are determined by the ±0.5 μsec window just described, since $$\frac{1}{1/15.734 \text{ KHZ} \pm 0.5 \mu s} = 15.734 \pm 0.125 \text{ KHZ}.$$

The loop gain is approximately adjusted using resistors 316 and 317 so that this full 250 Hz range can be realized.

The output of tri-state gate 303 drives a first order R/C network (low-pass filter) consisting of resistor 309 and capacitor 310, which act as a sample and hold circuit to correct the sync information at the start of each line. If the sync pulse arrives early, the output will be low a larger percentage of the time and, if late, the opposite. A voltage-controlled oscillator (VCO) 113 uses the filtered error voltage output from amplifier 312 to shift the VDP clock frequency so that the pixel (overlay) clock is phase locked with the sync pulse. The VCO can be a Texas Instruments Model 628 which is desirably set up to reduce internal gain, provide linear gain over an operating range within ±0.01 MHz of the VDP clock frequency, nominally 10 MHz, minimize gain variation from device to device, and allow for a large enough external capacitor 318 so that adequate temperature stability can be obtained.

To accommodate variation in VCO 113 output frequency and gain due to production spreads, the frequency bias voltage obtained from amplifier 312 must be variable to permit compensation. This variation is provided by potentiometer 315 and capacitor 319 (which together constitute variable bias circuit 117), which insure stable overlay and accommodate expected gain variation. Nominal values for VCO frequency and gain are established by frequency setting capacitor 318 and a bias network including resistors 320 and 322 and capacitor 321. Excessive gain beyond this range results in a over-correction of the time base error, while decreased gain causes a reduction of the lock/capture range. This may, in turn, cause degradation of the loop, resulting in an inability to correct time base error.

PLL 110 is locked by initially adjusting the frequency bias voltage potentiometer 315 so the loop is locked and a 50 percent duty cycle error signal (line 115) exists. The input signal for initialization can be a composite video waveform from video signal source 103 or a pulse waveform at 15.734±.010 KHZ. Adjustments to observe the error signal can be made without a scope by using a video source and observing the overlay itself on a video monitor. The setting over the lock range must be centered to insure symmetric lock/capture.

Divide-by-n circuit 114 is connected between the output of VCO 113 and the input of phase detector 111. "n" has an integer value equal to the VDP clock frequency divided by the horizontal sync frequency. The loop thus only uses the information at 15.7 KHZ for tracking and ignores all sync information at twice the rate (e.g., every other positive edge during the vertical and equalizing intervals).

The purpose of sync circuit 120, shown in detail in FIG. 4, is to overcome the vertical jitter and retrace problems caused by noise in the video disc output signal. Since problems exist if the stripped sync is directly used to drive the VDP's sync input on line 153, circuit 120 reconstructs the sync information necessary for the VDP. Horizontal sync pulses are constructed by using the 15.7 KHZ signal from divide circuit 114 of PLL 110. This signal is free of noise (due to the gating window provided by PLL 110), tracks the horizontal sync, and is synchronous with the VDP clock. In addition to the horizontal counter, the VDP requires that the last vertical sync pulse be used to reset the counter. Thus, the only additional sync information required is a single vertical pulse which is generated as follows. Low pass filter 121 of FIG. 1, which includes resistor 407 and capacitor 401 having a 40 µs time constant, is used to integrate the stripped sync signal. The vertical interval can be located since the average value of the waveform is greater during the interval, as indicated in the following table:

| interval/waveform | avg. value (% of full scale) |
| --- | --- |
| horizontal | 7.4 |
| equalizing | 8.0 |
| vertical | 86 |
| horizontal with max noise pulse | 11 |

The sync signal formed in low pass filter 121 is compared against a reference voltage formed by resistor 408. resistor 409 and capacitor 410 by a comparator 402 with hysteresis generated by resistors 411-413. Comparator 402 is triggered from the center of the third vertical sync pulse to the point midway between the first and second equalizing pulses. This provides sufficient noise margin for the rising edge and maximum waveform slope for the falling edge. Worst case noise occurs when a maximum width noise pulse is adjacent to a horizontal sync pulse. Hysteresis is required to prevent comparator 402 from toggling near the rising edge due to the ripple in the signal as capacitor 401 discharges slightly after the vertical pulse. The falling edge is used to fire a one shot 404 until the middle of the second and third equalizing pulse. This signal and the horizontal sync are logically ORed in gate 405 (which performs the function of adder 123 in FIG. 1) and the resultant signal on line 153 used to drive the VDP's sync input. With the foregoing arrangement, minimal upward vertical overlay shift (4 lines) occurs due to loss of every other positive edge during the equalizing interval. A horizontal shift of 0.5 µS to the right, due to a phase difference in the PLL phase detector, also occurs.

Referring now to FIG. 5, there is shown in detail the color subcarrier circuit 160 of FIG. 1 which regenerates a subcarrier clock at 3.58+ MHz which is phase locked to the color burst of the video signal from source 103. This clock is used by certain video display processors to insure color lock between itself and the output of video signal source 103. However, the TI 9918A VDP does not require this signal, since color overlay is not provided. The color subcarrier regenerator circuit 160 includes key pulse generator 161, chroma processor 162, and an amplifier/zero crossing defector 163. Key pulse generator 161, shown in detail in FIG. 5, includes two serially connected monostables 502 and 503. The 15.7 KHZ signal from divide circuit 114 of PLL 110 is used as an input, since the unprocessed stripped sync signal contains unwanted noise. If the unprocessed sync signal is used, the noise will cause erroneous operation of the subcarrier regenerator which shows up as color variations of the overlay. Monostable 502 is used to position the key pulse output from generator 161 on line 164, while monostable 503 is used to determine the width of the key pulse. Chroma processor 162 (which may be an RCA CA3126) generates a continuous wave (CW) subcarrier signal at 3.58 MHz. Signal inputs include the color video signal from line 151 and the key input on line 164. Crystal 505 and trimmer capacitor 501 determine the center frequency, which resistor 507 and capacitors 508, 509 and 506 control filtering of the signal. The CW subcarrier output on line 165 is amplified by a wide bandwidth amplifier 510; resistors 511 and 512 control its gain while capacitor 513 provides frequency compensation to insure stability. Amplifier 514 detects the zero crossings of the amplified signal and provides the desired subcarrier clock output on line 166.

The present invention was evaluated using a representative video disc and commercial video disc players. An overlay was produced with the maximum amount of text, so all lines involved could be examined. Less than one percent of the frames were found to contain any line(s) which caused horizontal jitter. The residual jitter was acceptable and was due to noise within the ±0.5 µS window which is necessary to eliminate the time base error.

Various modifications and adaptations of the present invention may be made by those skilled in the art. Accordingly, it is intended that the present invention be limited only by the appended claims.

What is claimed is:

1. Apparatus for providing an interface between a source of a video signal which includes horizontal and vertical synchronization information and a video display processor (VDP) arranged to generate an overlay for a picture represented by said video signal, including
    (a) a means for extracting said synchronization information from a level adjusted version of said video signal,
    (b) means including a phase-locked loop responsive to said extracting means for (1) generating a single reconstructed horizontal synchronization pulse during each scan interval determined by said horizontal synchronization information and (2) providing a clock signal to said video display processor which is locked to said horizontal synchronization information,
 (c) means including a low-pass filter responsive to said extracting means for recovering said vertical synchronization, and
 (d) means for combining outputs of said two last mentioned means to form a composite sychronizatin signal adapted for application to said VDP.

2. The invention defined in claim 1 wherein said apparatus further includes means jointly responsive to an output form said phase-locked loop and said level adjusted version of said video signal for deriving a color subcarrier input for said VDP.

3. Apparatus for conditioning a video signal for application to a video display processor (VDP), said video signal including horizontal and vertical synchronization information, including:
 means including a phase-locked loop for deriving a clock input for said VDP which is locked to said horizontal synchronization information; and
 means for providing a composite synchronization signal to said VDP by combining a low pass filtered version of said vertical synchronization information with a reconstructed horizontal synchronization signal which is generated once per scan interval during a gating window established in response to said horizontal synchronization information.

4. An interface between a source of video signals and a display processor adapted to overlay a picture represented by said video signals with user defined information, said video signals including horizontal and vertical synchronization information, said interface comprising:
 (a) means including a phase locked loop for providing a clock signal for clocking said user defined information into said display processor; and
 (b) means for providing a synchronization signal for sychronizing said VDP to said video signal;
 said last mentioned means including:
 (1) a sync stripper for removing said horizontal and vertical synchronization information from said video signal;
 (2) means responsive to an output from said sync stripper for deriving a low pass filtered version of said vertical synchronization information; and
 (3) means for combining said low pass filtered version with a reconstructed horizontal synchronization signal which is generated once per scan interval during a gating window established in response to said horizontal synchronization information.

* * * * *